US012756613B2

(12) United States Patent
Ryu et al.

(10) Patent No.: US 12,756,613 B2
(45) Date of Patent: Oct. 6, 2026

(54) SIGNAL TRANSMISSION METHOD AND SIGNAL RECEPTION METHOD OF HETEROGENEOUS SYSTEMS SHARING FREQUENCY BAND

(71) Applicant: ELECTRONICS AND TELECOMMUNICATIONS RESEARCH INSTITUTE, Daejeon (KR)

(72) Inventors: Kwanwoong Ryu, Daejeon (KR); Chung Sup Kim, Daejeon (KR); Hyuk Je Kim, Daejeon (KR); Sung Woong Choi, Daejeon (KR); Kwonhue Choi, Daejeon (KR); Hyung-seop Son, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 301 days.

(21) Appl. No.: 18/444,130

(22) Filed: Feb. 16, 2024

(65) Prior Publication Data

US 2024/0333574 A1 Oct. 3, 2024

(30) Foreign Application Priority Data

Mar. 21, 2023 (KR) ........................ 10-2023-0036539

(51) Int. Cl.
*H04L 27/26* (2006.01)

(52) U.S. Cl.
CPC ........ *H04L 27/265* (2013.01); *H04L 27/2607* (2013.01); *H04L 27/2628* (2013.01)

(58) Field of Classification Search
None
See application file for complete search history.

(56) References Cited

U.S. PATENT DOCUMENTS

| | | | |
|---|---|---|---|
| 10,999,026 | B2 | 5/2021 | Lee et al. |
| 11,558,157 | B2 | 1/2023 | Rakib et al. |

(Continued)

FOREIGN PATENT DOCUMENTS

KR 10-0980677 B1 9/2010

OTHER PUBLICATIONS

Fahimeh Jasbi et al., "Hybrid Overlay/Underlay Cognitive Radio Network With MC-CDMA," IEEE Transactions on Vehicular Technology, Apr. 2016, vol. 65, No. 4.

(Continued)

*Primary Examiner* — Phirin Sam

(57) ABSTRACT

Provided are a signal transmission method and signal reception method of heterogeneous systems sharing a frequency band. The signal transmission method performed by a transmitter of a target communication system sharing a frequency band of a general communication system in an underlay form includes mapping information symbols to be transmitted to a delay-Doppler (DD) domain and determining an information symbol mapping matrix, applying an inverse symplectic finite Fourier transform (ISFFT) to the information symbol mapping matrix and transforming the information symbol mapping matrix into a frequency-time (FT) matrix, and applying a Heisenberg transform to the FT matrix and generating a transmission signal of a time domain.

15 Claims, 8 Drawing Sheets

(56) References Cited

U.S. PATENT DOCUMENTS

| | | | | |
|---|---|---|---|---|
| 2005/0147025 | A1* | 7/2005 | Auer | H04B 7/0684<br>375/267 |
| 2012/0113942 | A1 | 5/2012 | Kim | |
| 2017/0343750 | A1* | 11/2017 | Ashrafi | H04J 14/07 |
| 2019/0376384 | A1* | 12/2019 | Kusuma | E21B 47/18 |
| 2020/0014992 | A1 | 1/2020 | Chung et al. | |
| 2021/0367645 | A1* | 11/2021 | Delfeld | H04L 5/0048 |
| 2022/0022079 | A1* | 1/2022 | Wang | H04L 25/0222 |
| 2022/0038155 | A1* | 2/2022 | Akoum | H04B 7/0482 |
| 2022/0311493 | A1* | 9/2022 | Wang | H04L 27/2613 |
| 2022/0312363 | A1* | 9/2022 | Krach | H04B 7/04 |
| 2023/0327827 | A1* | 10/2023 | Patchava | H04L 5/0046<br>370/329 |
| 2023/0336399 | A1* | 10/2023 | Hadani | H04L 27/32 |
| 2024/0056344 | A1* | 2/2024 | Patchava | H04L 27/2605 |
| 2024/0163140 | A1* | 5/2024 | Wang | H04L 27/2636 |

OTHER PUBLICATIONS

Yao Ge et al., "OTFS Signaling for Uplink NOMA of Heterogeneous Mobility Users," IEEE Transactions on Communications, May 2021, vol. 69, No. 5.

* cited by examiner

SIGNAL TRANSMISSION METHOD AND SIGNAL RECEPTION METHOD OF HETEROGENEOUS SYSTEMS SHARING FREQUENCY BAND

CROSS-REFERENCE TO RELATED APPLICATION(S)

This application claims the priority benefit of Korean Patent Application No. 10-2023-0036539 filed on Mar. 21, 2023, in the Korean Intellectual Property Office, the disclosure of which is incorporated herein by reference for all purposes.

BACKGROUND

1. Field

One or more example embodiments relate to a method of sharing a frequency between heterogeneous systems, and more specifically, to a signal transmission method and a signal reception method, which are performed by a communication device of a target communication system sharing a frequency band of a general communication system in an underlay form.

2. Description of Related Art

The recent evolution to a fifth-generation (5G) wireless communication service and the rapid growth of mobile smart devices have dramatically increased data-centric mobile traffic use, which is aggravating the issue of frequency scarcity. To resolve the issue, substantial amounts of research are underway on frequency sharing or a new frequency band of mmWave band in addition to a typically used frequency band that is less than or equal to 6 gigahertz (GHz).

A spectrum access method for frequency sharing includes underlay, overlay, and hybrid methods. The underlay method allows two users to use a frequency band at the same time, in which an interference signal from a secondary user (SU) to a primary user (PU) is less than or equal to a certain threshold or an interference mitigation algorithm is applied to mitigate interference between the two users.

SUMMARY

An aspect provides technology for transmitting a signal with excellent performance by arranging information symbols sparsely in a delay-Doppler (DD) domain, which is performed by a transmitter of a target communication system sharing a frequency band of a general communication system in an underlay form in a method of frequency sharing between heterogeneous systems.

Another aspect also provides technology for receiving a signal with excellent performance in a time domain and a frequency-time (FT) domain, which is performed by a receiver of a target communication system, by using an interference component of a general communication system in a proposed frequency sharing method of an underlay form.

However, technical aspects are not limited to the foregoing aspects, and there may be other technical aspects.

According to an aspect, there is provided a signal transmission method performed by a transmitter of a target communication system sharing a frequency band of a general communication system in an underlay form including mapping information symbols to be transmitted to a DD domain and determining an information symbol mapping matrix; applying an inverse symplectic finite Fourier transform (ISFFT) to the information symbol mapping matrix and transforming the information symbol mapping matrix into a FT matrix; and applying a Heisenberg transform to the FT matrix and generating a transmission signal of a time domain.

The determining may include mapping the information symbols to the DD domain such that a distance between the information symbols is maximized and determining the information symbol mapping matrix.

The determining may include mapping the information symbols to a position determined by applying a random number and determining the information symbol mapping matrix.

The determining may include arranging the information symbols consecutively in a region of the DD domain and determining the information symbol mapping matrix.

The transforming may include applying a column-direction inverse fast Fourier transform (IFFT) and a row-direction IFFT to the information symbol mapping matrix and transforming the information symbol mapping matrix into the FT matrix.

The generating may include applying M-point IFFT to the FT matrix and deriving a delay-time (DT) matrix including samples of a DT domain and performing signal processing on the DT matrix and generating a transmission signal of a time domain.

The generating may further include adding a cyclic prefix (CP) signal by vectorizing the DT matrix in a row direction and generating the transmission signal of the time domain by performing parallel to serial (P/S) conversion.

According to another aspect, there is provided a signal reception method performed by a receiver of a target communication system sharing a frequency band of a general communication system in an underlay form including determining an estimate for a transmission signal of a time domain from a reception signal; deriving a DT matrix comprising samples of a DT domain from the estimate for the transmission signal of the time domain; applying a Wigner transform to the DT matrix and deriving a FT matrix including samples of an FT domain from the DT matrix; and applying a symplectic finite Fourier transform (SFFT) to the FT matrix and extracting information symbols of a DD domain, in which the determining includes using a covariance matrix of primary user signals transmitted and received through the general communication system and determining the estimate for the transmission signal of the time domain.

The covariance matrix of the primary user signals may be determined by using a cross-correlation function for a primary user signal of a uth subband.

The signal reception method may further include removing a CP signal from the reception signal and the determining may further include using the reception signal from which the CP signal is removed and determining the estimate for the transmission signal of the time domain.

The transmission signal of the time domain may be generated by mapping the information symbols to the DD domain such that a distance between the information symbols is maximized.

The transmission signal of the time domain may be generated by mapping the information symbols to the DD domain at a position determined by applying a random number.

The transmission signal of the time domain may be generated by arranging the information symbols consecutively in a region of the DD domain.

According to an aspect, in a method of frequency sharing between heterogeneous systems, a transmitter of a target communication system sharing a frequency band of a general communication system in an underlay form may transmit a signal with excellent performance by arranging information symbols sparsely in a DD domain.

According to another aspect, in a proposed frequency sharing method of an underlay form, a receiver of a target communication system may receive a signal with excellent performance through a minimum mean square error (MMSE) reception method in a time domain and an FT domain by using an interference component of a general communication system.

Additional aspects of example embodiments will be set forth in part in the description which follows and, in part, will be apparent from the description or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
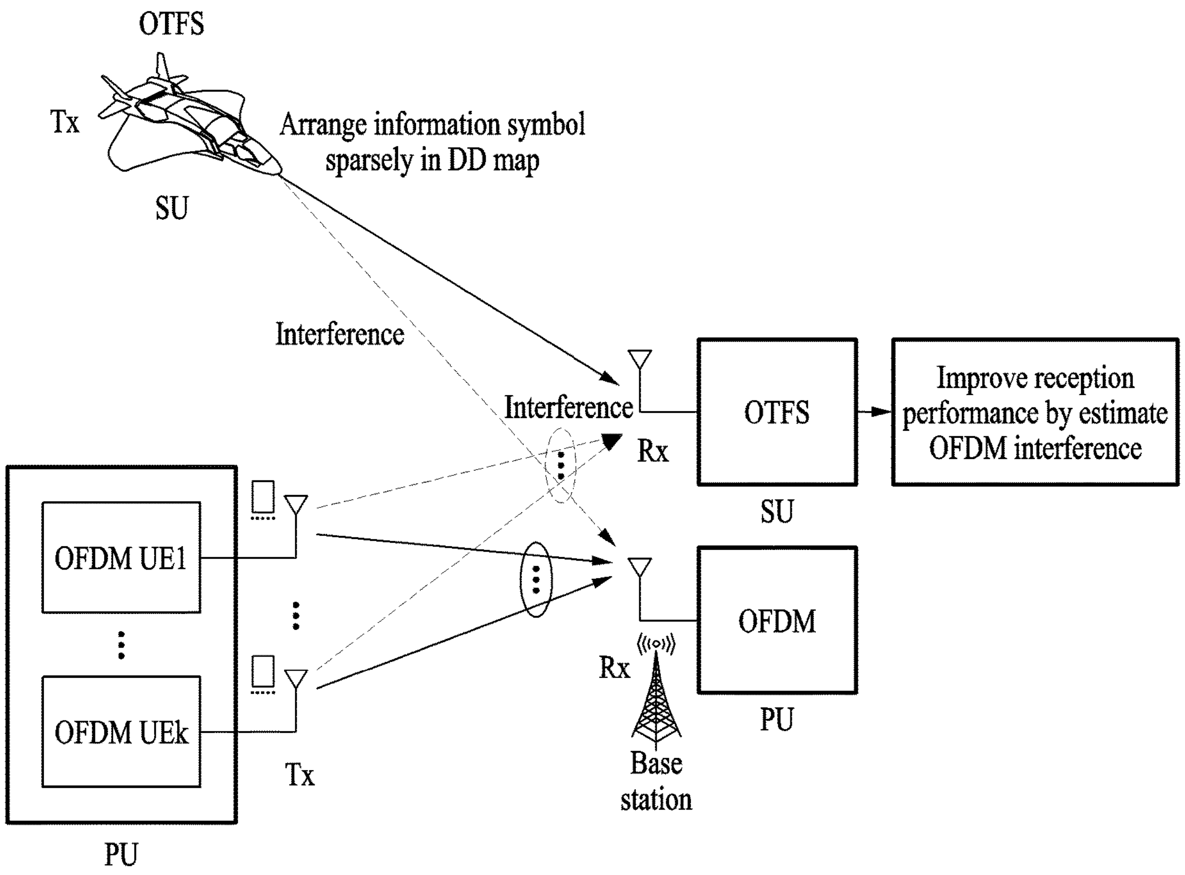
FIG. 1 is a diagram illustrating a frequency sharing system of an underlay method according to an embodiment.

The following detailed structural or functional description is provided as an example only and various alterations and modifications may be made to embodiments. Here, examples are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a," "an," and "the" are intended to include the plural forms as well, unless the context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. It will be further understood that the terms "comprises/including" and/or "includes/including" when used herein, specify the presence of stated features, integers, operations, operations, elements, and/or components, but do not preclude the presence or addition of one or more other features, integers, operations, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art and are not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like elements and a repeated description related thereto will be omitted.

Figure 2:
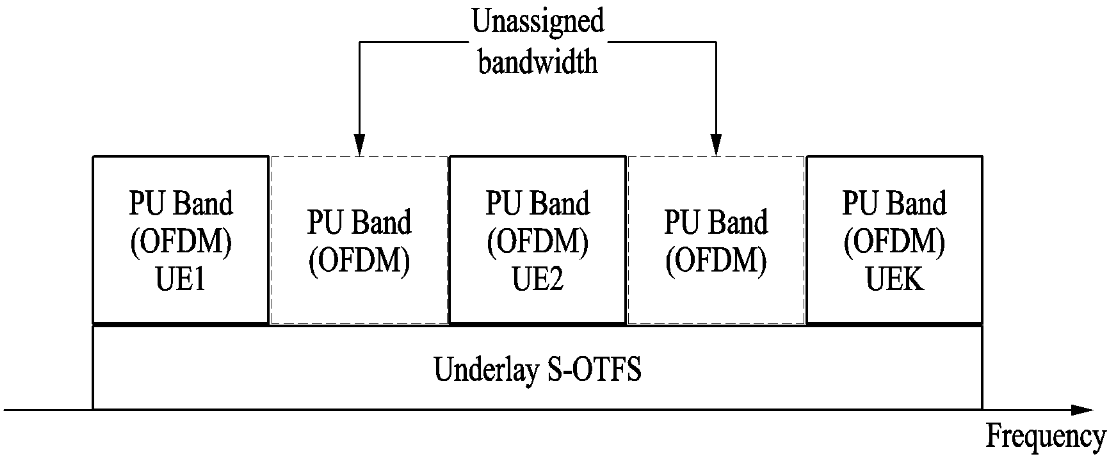
FIG. 2 is a diagram illustrating a spectrum sharing method of the underlay method according to an embodiment.

FIGS. 1 and 2 are diagrams illustrating a frequency sharing system of an underlay method according to an embodiment and a spectrum sharing method of the underlay method according to an embodiment, respectively.

There are growing demands for various heterogeneous application services, such as an unmanned aerial vehicle (UAV) or integrated sensing and communication (ISAC), in the next-generation wireless communication B5G. A target communication system is required for stable communication of such heterogeneous application services with high mobility in an environment where a frequency band of a general communication system (e.g., a frequency division multiplexing (FDM)-based multi-user signal, such as a filter bank multi-carrier (FBMC), etc.) is shared in an underlay form.

Hereinafter, it is assumed that the general communication system in the frequency sharing system of the underlay method uses an orthogonal frequency division multiple access (OFDMA) method among FDM-based multi-user signals. However, the OFDMA method is just an example, but examples are not limited thereto. In addition, it is assumed that the target communication system in the frequency sharing system of the underlay method uses an orthogonal time frequency space (OTFS) method that is robust against a Doppler effect caused by high-speed movement.

Each of primary users (PUs) using the general communication system of the ODFMA method may be assigned consecutive subcarrier subbands (SBs) in a certain size among all frequency bands, and frequency bands may be frequently empty among all the frequency bands according to a wireless access situation of the PUs as illustrated in FIG. 2.

In contrast, secondary users (SUs) using the target communication system of the OTFS method may transmit a signal at low power less than or equal to a certain threshold, not affecting the PUs in all the frequency bands.

In this case, the SUs using the target communication system of the OTFS method may reduce reception complexity by arranging information symbols sparsely in a delay-Doppler (DD) domain and transmitting a signal and may improve reception performance by using an interference component of the general communication system.

Figure 3:
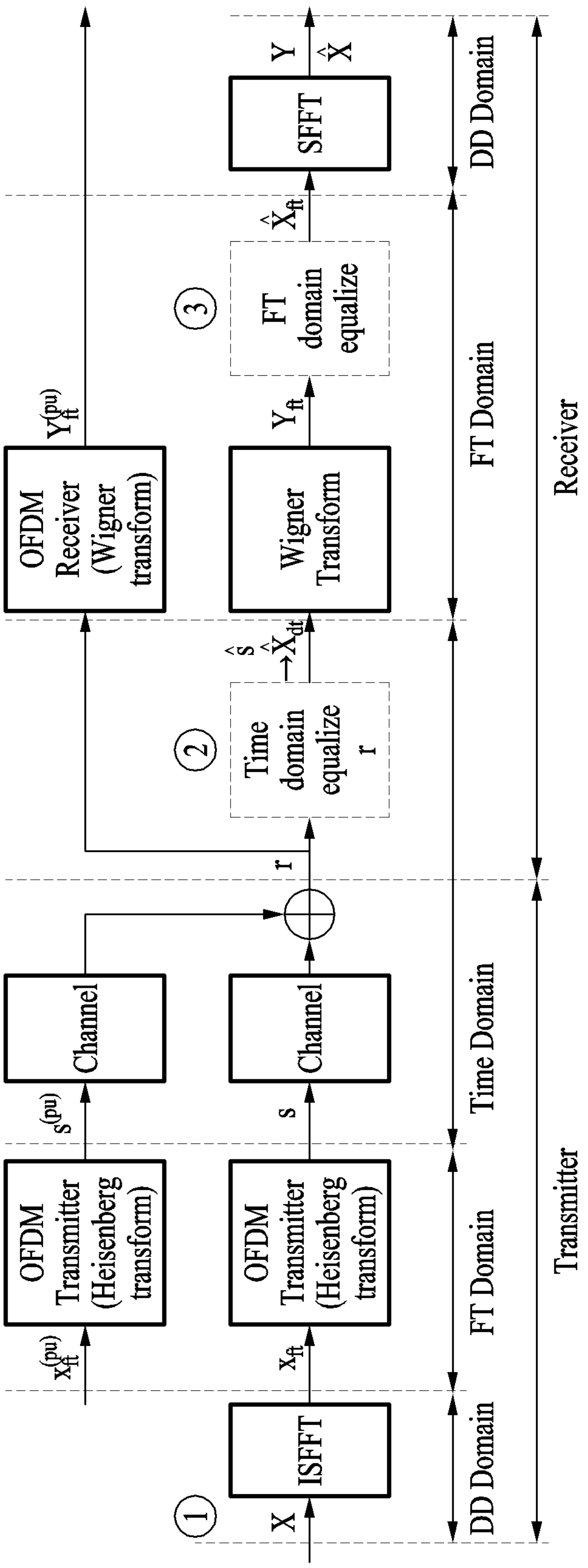
FIG. 3 is a block diagram illustrating the frequency sharing system in the underlay method according to an embodiment.

FIG. 3 is a block diagram illustrating the frequency sharing system in the underlay method according to an embodiment.

FIG. 3 illustrates a signal transmission and reception method performed by a communication device of a target communication system (an OTFS method) sharing a frequency band of a general communication system (an OFDMA method) in an underlay form.

Figure 4:
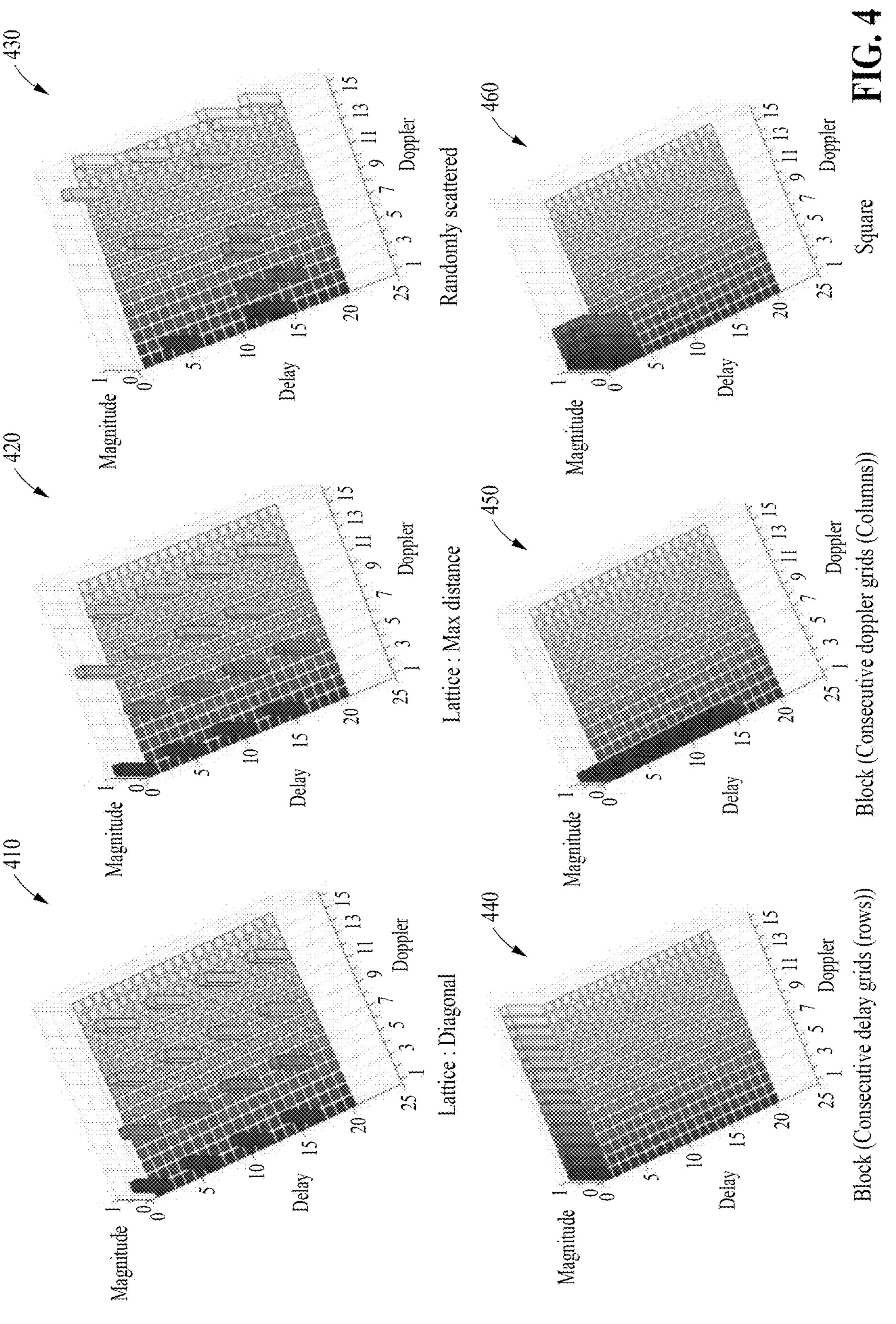
FIG. 4 is a diagram illustrating various methods of mapping information symbols to a delay-Doppler (DD) domain, according to an embodiment.
Figure 5:
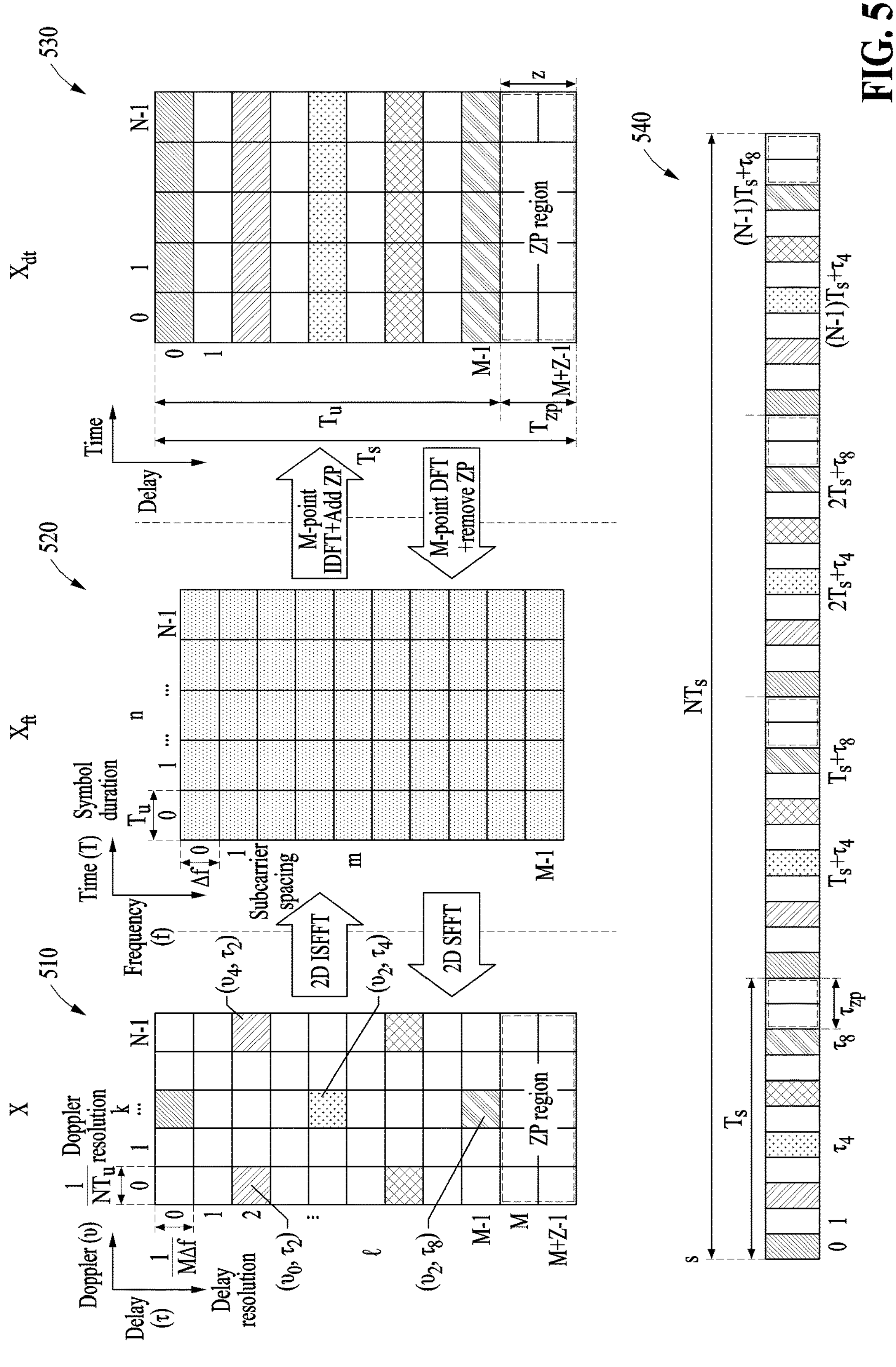
FIG. 5 is a diagram illustrating an inter-domain conversion method of an orthogonal time frequency space (OTFS) method according to an embodiment.

First, a transmitter of the target communication system (the OTFS method) may map information symbols to be transmitted to a DD domain and may determine an information symbol mapping matrix X in ①. In this case, the transmitter may arrange and map the information symbols sparsely in the DD domain as illustrated in FIG. 4 to transmit a signal at low power that is less than or equal to a certain threshold and does not affect PUs using the general communication system and may determine the information symbol mapping matrix X as a first region 510 illustrated in FIG. 5. However, the information symbol mapping matrix X as the first region 510 illustrated in FIG. 5 is just an example, and examples are not limited thereto.

FIG. 4 is a diagram illustrating various methods of a transmitter arranging $N_S$ information symbols sparsely in an information symbol mapping matrix X, which is an M×N matrix of a DD domain, when M=2, N=16, and $N_S$=16, according to an embodiment. In this case, the transmitter may assign an information symbol to a position where a magnitude is 1 in the information symbol mapping matrix X and may not assign an information symbol to other positions.

For example, Lattice:Diagonal 410 of FIG. 4 is an example of arranging information symbols in the information symbol mapping matrix X such that a distance between the information symbols is maximized while interference due to overlap on a delay axis is minimized.

Lattice:Max distance 420 of FIG. 4 is an example of arranging information symbols in the information symbol mapping matrix X such that a distance between the information symbols is maximized regardless of overlap on the delay axis.

Random scattered 430 of FIG. 4 is an example of arranging information symbols at a position of the information symbol mapping matrix X determined by applying a random number.

Block 440, Block 450, and Square 460 of FIG. 4 are examples of arranging information symbols consecutively in a domain of the information symbol mapping matrix X, which may be classified into a consecutive delay grid (row, 64×1), a consecutive Doppler grid (columns, 4×16), and a square type (8×8), respectively.

The transmitter may apply an inverse symplectic finite Fourier transform (ISFFT) performing a column-direction inverse fast Fourier transform (IFFT) and a row-direction IFFT as shown in Equation 1 to the information symbol mapping matrix X and may transform the information symbol mapping matrix X into a frequency-time (FT) matrix $X_{ft}$ as a second region 520 illustrated in FIG. 5.

$$X_{ft} = F_M \cdot X \cdot F_N^H \qquad \text{Equation 1}$$

Here, $F_M \in \mathbb{C}^{M\times M}$ and $F_N \in \mathbb{C}^{N\times N}$ respectively denote a normalized M-point discrete Fourier transform (DFT) and a normalized N-point DFT.

Then, the transmitter may apply a Heisenberg transform to the FT matrix $X_{ft}$ and may generate a transmission signal s of a time domain. First, the transmitter may add zero padding (ZP) of a Z length after applying an M-point inverse discrete Fourier transform (IDFT) as a third region 530 illustrated in FIG. 5 to the FT matrix $X_{ft}$ as shown in Equation 2 and may obtain a signal $X_{dt,ZP} \in \mathbb{C}^{(M+Z)\times N}$ of a delay-time (DT) domain.

$$X_{dt} = F_M^H \cdot X_{ft} \qquad \text{Equation 2}$$

$$X_{dt,ZP} = \begin{bmatrix} [O_{Z\times(M-Z)}\ I_{Z\times Z}] \\ I_{M\times M} \end{bmatrix} \cdot X_{dt}$$

When assuming a transmission pulse shaping filter is rectangular in a signal $X_{dt,ZP}$ of the DT domain and vectorizing the transmission pulse shaping filter in a row direction, the transmitter may generate a transmission signal $s^{(s)} \in \mathbb{C}^{(M+Z)N\times 1}$ of the time domain as a fourth region 540 illustrated in FIG. 5 according to Equation 3 and may transmit the transmission signal $s^{(s)} \in \mathbb{C}^{(M+Z)N\times 1}$ to a receiver of a target communication system (an OTFS method).

$$s = vec\ (X_{dt,ZP}) \qquad \text{Equation 3}$$

In addition, the transmitter of PUs using a general communication system may add a cyclic prefix (CP) signal of the Z length after applying the M-point IDFT to an FT matrix $$X_{ft}^{(pu)}$$

and may obtain a signal $$X_{dt,CP}^{(pu)} \in \mathbb{C}^{(M+Z)\times N}$$

of the DT domain as shown in Equation 4.

$$X_{dt}^{(pu)} = F_M^H \cdot X_{ft}^{(pu)} \qquad \text{Equation 4}$$

$$X_{dt,CP}^{(pu)} = \begin{bmatrix} I_{M\times M} \\ O_{Z\times M} \end{bmatrix} \cdot X_{dt}^{(pu)}$$

When assuming the transmission pulse shaping filter is rectangular in a signal $$X_{dt,CP}^{(pu)}$$

of the DT domain and vectorizing the signal $$X_{dt,CP}^{(pu)}$$

in the row direction, the transmitter of the PUs may generate a transmission signal $s^{(pu)}$ of the time domain as shown in Equation 5.

$$s^{(pu)} = vec\left(X_{dt,CP}^{(pu)}\right) \quad \text{Equation 5}$$

The receiver of the target communication system (the OTFS method) may remove a CP through analog-to-digital conversion (ADC) from a reception signal r(t) received by being transmitted by the transmitter and identify a reception signal $r \in \mathbb{C}^{N(M+Z)\times 1}$ of the time domain as shown in Equation 6.

$$r = G\cdot s + G^{(pu)}\cdot s^{(pu)} + \overline{w} \quad \text{Equation 6}$$

Here, $G^{(pu)}\cdot s^{(pu)}$ denotes a signal received by an SU from a PU and may act as an interference source on the receiver of the target communication system (the OTFS method).

The receiver may transform a signal r' from which a CP/ZP is removed from an identified reception signal r of the time domain into a reception signal $R \in \mathbb{C}^{M\times N}$ of the time domain through Equation 7.

$$R = vec^{-1}(r') \quad \text{Equation 7}$$

Then, the receiver may apply a Wigner transform to the reception signal $R \in \mathbb{C}^{M\times N}$ of the time domain as shown in Equation 8 and may derive an FT matrix $Y_{ft} \in \mathbb{C}^{M\times N}$ including samples of the FT domain.

$$Y_{ft} = F_M R \quad \text{Equation 8}$$

The receiver may apply a symplectic finite Fourier transform (SFFT) to the FT matrix $Y_{ft} \in \mathbb{C}^{M\times N}$ derived through the Wigner transform as shown in Equation 9 and may extract an information symbol mapping matrix Y mapped to the DD domain.

$$Y = F_M^H Y_{ft} F_N \quad \text{Equation 9}$$

In addition, the receiver of the PUs using the general communication system may remove a CP through ADC from the reception signal r(t) received by being transmitted from the transmitter and may identify the reception signal $r \in \mathbb{C}^{N(M+Z)\times 1}$ of the time domain as shown in Equation 10.

$$r^{(pu)} = G^{(pu)}\cdot s^{(pu)} + G\cdot s + \overline{w}^{(pu)} \quad \text{Equation 10}$$

Here, G·s denotes a signal received by a PU from an SU and may act as an interference source on a receiver of the general communication system (an OFDM method).

Then, the receiver of the PUs may transform a signal $(r^{(pu)})'$ from which the CP is removed from an identified reception signal $r^{(pu)}$ of the time domain into a reception signal $R^{(pu)} \in \mathbb{C}^{M\times N}$ of the time domain through Equation 11.

$$R^{(pu)} = vec^{-1}\left(\left(r^{(pu)}\right)'\right) \quad \text{Equation 11}$$

Then, the receiver of the PUs may apply the Wigner transform to the reception signal $R^{(pu)} \in \mathbb{C}^{M\times N}$ of the time domain as shown in Equation 12 and may derive an FT matrix $$Y_{ft}^{(pu)} \in \mathbb{C}^{M\times N}$$

including the samples of the FT domain.

$$Y_{ft}^{(pu)} = F_M R^{(pu)} \quad \text{Equation 12}$$

In addition, the receiver of the target communication system (the OTFS method) may use a time domain equalizer ② as illustrated in FIG. 3 to increase the accuracy of detecting an OTFS reception signal in a frequency sharing situation.

More specifically, the OTFS reception signal received by the receiver of the target communication system (the OTFS method) may be represented by Equation 13.

$$r = G\cdot s + G^{pu}s^{pu} + n \quad \text{Equation 13}$$

Here, s, r, $n \in \mathbb{C}^{N(M+Z)\times 1}$ respectively denote an OTFS transmission signal of the time domain, the OTFS reception signal of the time domain, and additive white Gaussian noise (AWGN) of the time domain, and $G \in \mathbb{C}^{N(M+Z)\times N(M+Z)}$ denotes an OTFS time domain channel matrix. $G^{pu}$ denotes an OFDM time domain channel matrix and $s^{pu}$ denotes an OFDM transmission signal.

In this case, OTFS signals of the time domain and OFDM signals s, r, n, $s^{pu} \in \mathbb{C}^{N(M+Z)\times 1}$ may each be divided into N blocks $$r_n, s_n, n_n, s_n^{pu} \in \mathbb{C}^{(M+Z)\times 1}, n = 0, \dots, N-1$$

of a size M as shown in Equation 14.

$$r_n = G_n\cdot s_n + G_n^{pu}s_n^{pu} + n_n \quad \text{Equation 14}$$

In this case, an OTFS time domain channel matrix $G \in \mathbb{C}^{N(M+Z)\times N(M+Z)}$ may be divided into diagonal N parallel linear block matrices $G_n \in \mathbb{C}^{(M+Z)\times(M+Z)}$. n=0, 1, 2, . . . , N−1, and an OFDM time domain channel matrix $G^{pu} \in \mathbb{C}^{(M+Z)\times(M+Z)}$ may be divided into diagonal N parallel linear block matrices $$G_n^{pu} \in \mathbb{C}^{(M+Z)\times(M+Z)}, n = 0, 1, 2, \dots, N-1.$$

The receiver may obtain a minimum mean square error (MMSE) to obtain a reception signal estimate $\hat{s}_n$ from the time domain reception signal $r_n$ as shown in Equation 15 when there is no signal transmitted by a PU.

$$\hat{s}_n = \frac{G_n^H}{G_n^H G_n + \sigma_n^2 I_{M+Z}} r_n \qquad \text{Equation 15}$$

Here, $$G_n^H$$

denotes a Hermitian matrix of $G_n$ and $I_{M+Z}$ denotes an (M+Z)×(M+Z) identity matrix. However, when there is a signal transmitted by the PU, the MMSE obtained through Equation 15 may not have excellent performance. This is because Equation 15 is designed to obtain an optimal $s_n$ estimate $\hat{s}_n$ by minimizing a mean square error (MSE) $e_{MSE}=E[(s_n-\hat{s}_n)^2]$ when there is no signal transmitted by the PU.

However, in a frequency sharing situation, the signal transmitted by the PU may act as an interference source, and Equation 15 may no longer derive an optimal $s_n$ estimate.

Accordingly, the present application proposes a transformed MMSE method by using a signal transmitted by a PU which acts as an interference source on a typical MMSE method in a frequency sharing situation.

More specifically, the receiver may obtain a transmission signal estimate $\hat{s}_n \in \mathbb{C}^{(M+Z)\times 1}$, n=0, . . . , N−1 in the time domain reception signal $r_n \in \mathbb{C}^{M\times 1}$ in a frequency sharing situation as shown in Equation 16.

$$\hat{s}_n = \frac{G_n^H}{G_n^H G_n + \sigma_{noise}^2 I_M + I_{cor}} r_n \qquad \text{Equation 16}$$

In this case, a difference with the typical MMSE method may be the signal transmitted by the PU which acts as an interference source, that is, a covariance matrix $I_{cor}$ of OFDM signals, may be added as a denominator when obtaining $\hat{s}_n$.

The receiver may arrange the calculated $\hat{s}_n \in \mathbb{C}^{(M+Z)\times 1}$, n=0, . . . , N−1 consecutively in a row direction and may obtain $\hat{s} \in \mathbb{C}^{N(M+Z)\times 1}$.

The covariance matrix $I_{cor}$ may be expressed by a sum of covariance matrices of an OFDM SB assigned to each user as shown in Equation 17.

$$I_{cor} = \sum_{u\in\mathcal{B}} C_{X_u X_u} \qquad \text{Equation 17}$$

Here, $U=M/M_o$ when dividing a whole band of an OFDM by $U_{SBs}$, and u=0, 1, 2, . . . , U−1 denotes an SB index. $\mathcal{B}$ denotes an index set of assigned SBs, in which $\mathcal{B}$ ={0, 1, 2, . . . , U−1} when all SBs are assigned to users, and $\mathcal{B}$ ={2,4} when second and fourth SBs are assigned. In addition, $C_{X_u X_u}$ denotes a time domain signal covariance matrix of a uth SB OFDM and may have a relationship with an autocorrelation function $R_{X_u X_u}(\tau)$ of an OFDM signal $X_u(n)$ of a uth SB as shown in Equation 18.

$$C_{X_u X_u}(n, n-\tau) = R_{X_u X_u}(\tau) \qquad \text{Equation 18}$$

Here, n may be a time domain OFDM sample index n=0, 1, 2, . . . , (M+Z−1) and an OFDM sample delay index τ=0, 1, 2, . . . , (M+Z−1). τ≥0 of $R_{X_u X_u}(\tau)$ in Equation 18 may be expressed by Equation 19.

Equation 19 when $\tau \geq 0$, $$R_{X_u X_u}(\tau) = \frac{1}{M+Z}\sum_{n=\tau}^{M+Z-1} X_u(n) X_u^*(n-\tau) = \frac{1}{M+Z}\sum_{n=\tau}^{M+Z-1}\sum_{k=uM_O}^{(u+1)M_O-1} |D(k)|^2 w^{-\tau k} = \frac{(M+Z-\tau)E_S^{(u)}}{M+Z}\sum_{k=uM_O}^{(u+1)M_O-1} w^{-\tau k}$$

when $\tau < 0$, $$R_{X_u X_u}(\tau) = R_{X_u X_u}^*(-\tau)$$

Here, $$E_s^{(u)} = |D(k)|^2,\ w = e^{-2j\pi/M},$$

and k may be an OFDM subcarrier index $k=uM_o+\{0, 1, 2, \ldots, M_o-1\}$ corresponding to an SB index u.

In addition, $X_u(n)$ may be an OFDM time domain signal of the u th SB and may be defined by Equation 20.

$$X_u(n) = \sum_{k=uM_0}^{(u+1)M_0-1} D(k) w^{-nk} \qquad \text{Equation 20}$$

Here, D(k) denotes an OFDM symbol.

Figure 6:
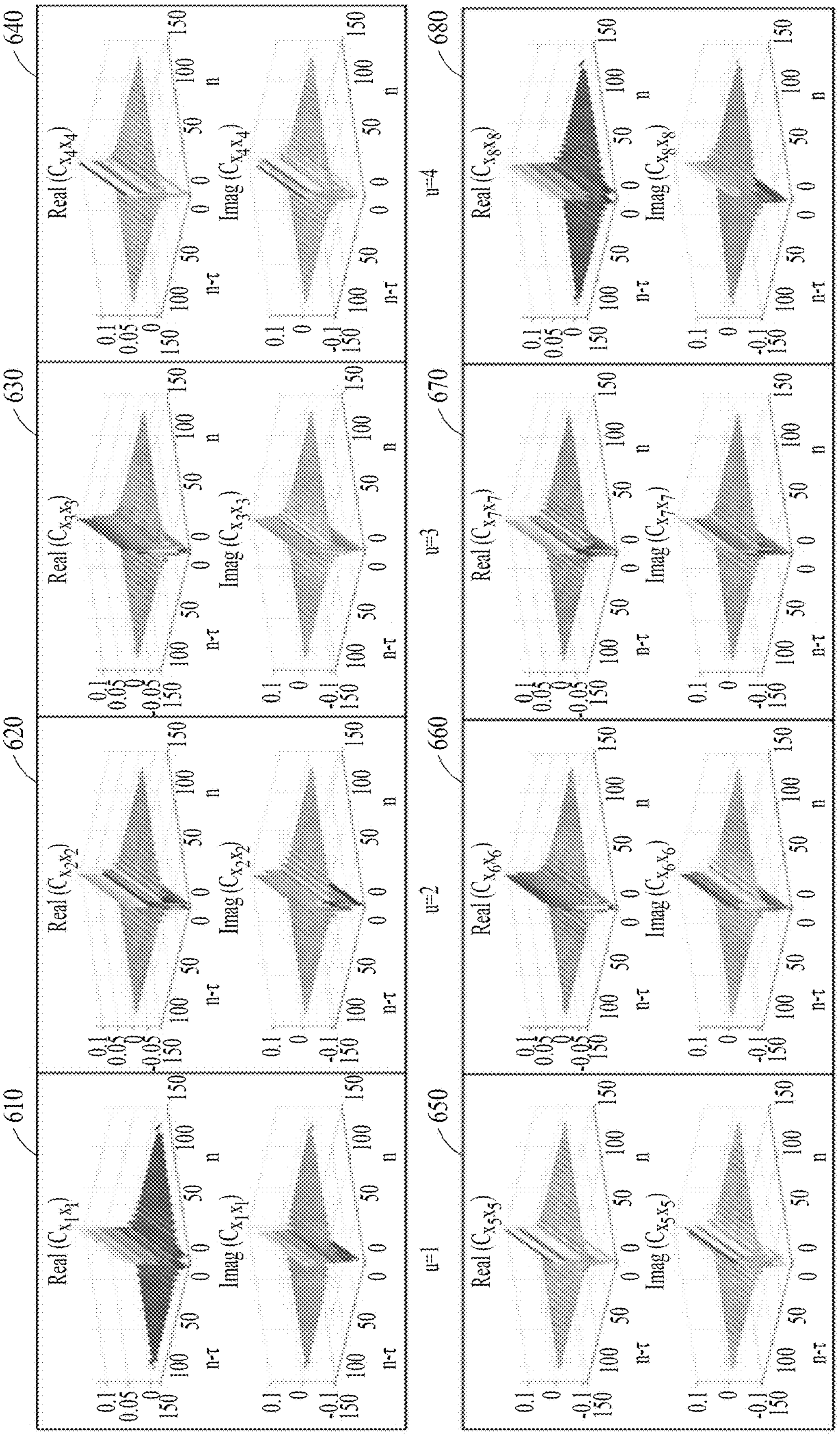
FIG. 6 is a diagram illustrating a covariance matrix of an nth subband SBn according to an embodiment.

The covariance matrix $I_{cor}$ of the uth SB SBu of Equation 17 may have, for example, a form as a first region 610 to an eighth region 680 illustrated in FIG. 6.

On the other hand, the receiver of the target communication system (the OTFS method) may use an FT domain equalizer ③ as illustrated in FIG. 3 to increase the accuracy of detecting an OTFS reception signal in a frequency sharing situation.

The receiver may represent an MMSE equalizer using signal tap equalization as Equation 21 when there is no signal transmitted by a PU.

$$\hat{X}_{tf} = \frac{H_{tf}^*(m, n) Y_{tf}(m, n)}{|H_{tf}(m, n)|^2 + \sigma_n^2} \qquad \text{Equation 21}$$

Here, m=0, . . . , M−1 and n=0, . . . , N−1.

Figure 7:
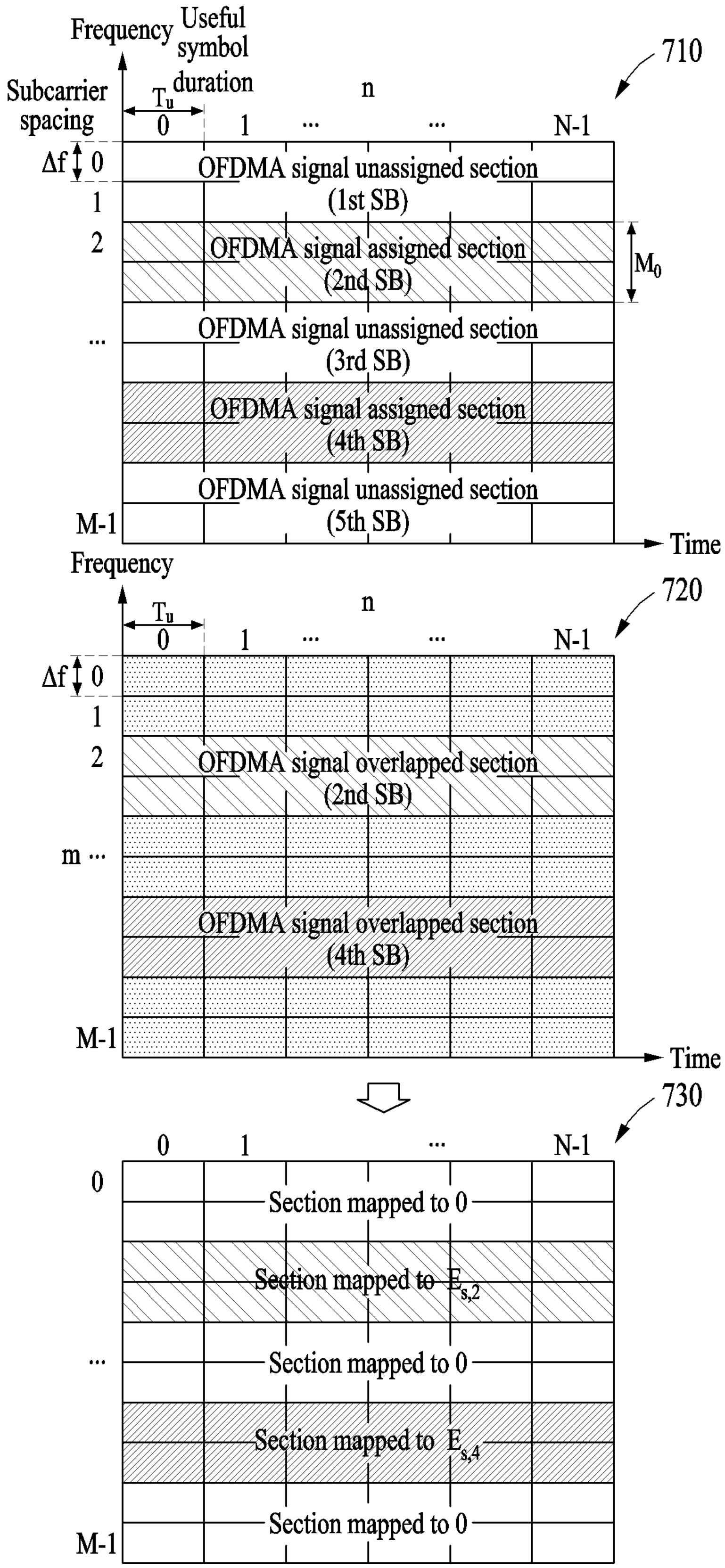
FIG. 7 is a diagram illustrating an orthogonal frequency division multiplexing (OFDM) variance matrix $I_{OFDM}$ corresponding to an M×N orthogonal time frequency space (OTFS) signal of a frequency-time (FT) domain according to an embodiment.

Like the time domain equalizer, since a signal transmitted by a PU which acts as an interference source may need to be used, interference of an OFDM signal in the FT domain may be used as illustrated in FIG. 7.

In this case, the receiver may add a variance of the OFDM signal transmitted by the PU which acts as an interference source and may modify Equation 21 as shown in Equation 22.

$$\hat{X}_{tf}(m, n) = \frac{H_{tf}^*(m, n) Y_{tf}(m, n)}{|H_{tf}(m, n)|^2 + \sigma_n^2 + I_{OFDM}(m, n)} \qquad \text{Equation 22}$$

Here, $$m = 0, \ldots , M-1, n = 0, \ldots, N-1, \sigma_n^2$$

denotes a noise power matrix of M×N. $I_{OFDM}$ denotes a M×N matrix representing a variance value of an OFDM signal which is an interference component of OFDM signals acting as an interference source.

FIG. 7 illustrates a mapping method of a matrix $I_{OFDM}$ of OFDM interference and an FT domain of an SU (a spread orthogonal time frequency space (S-OTFS) method). A first region 710 of FIG. 7 illustrates an FT domain of a PU, a second region 720 of FIG. 7 illustrates a shared section of the SU and the PU of an FT domain, and a third region 730 of FIG. 7 illustrates a $I_{OFDM}$ OFDM interference matrix. As the first region 710 and the second region 720 illustrated in FIG. 7, a whole frequency band of a PU OFDM is the same as a whole frequency band of an SU S-OTFS, which is MΔf. $M_o$Δf=MΔf/U when dividing a whole frequency band of the FT domain of the PU of the first region 710 of FIG. 7 by U frequency SBs, and $M_o$ may be the number of consecutive subcarriers assigned to one SB. u=1, 2, . . . , U may be obtained when assuming an SB index to be u to distinguish an SB. The first region 710 of FIG. 7 illustrates $M_o$=2 when M=10 and U=5, and among all assignable SBs U=5, u=2 and u=4 are assigned to a user.

An S-OTFS signal may overlap an OFDM signal in the second and fourth SBs (an interference section) that are an OFDMA signal-assigned section of the first region 710 of FIG. 7 in the FT domain of the SU (the S-OTFS method) of the second region 720 of FIG. 7, and there is no overlap in the remaining sections because no OFDMA signals are assigned thereto. Accordingly, as the third region 730 illustrated in FIG. 7, an OFDM interference matrix $I_{OFDM}$ may be mapped to an average energy value per SB, or an overlapped section, and the remaining OFDMA unassigned sections are mapped to 0 as shown in Equation 23.

$$I_{OFDM} = \begin{cases} \sigma_{OFDM,u}^2 & u \in \mathcal{B} \\ 0 & \text{otherwise} \end{cases} \quad \text{Equation 23}$$

Here, u denotes an SB index, and $$\sigma_{OFDM,u}^2$$

denotes an OFDM average variance value of a uth SB, in which $\mathcal{B}$ denotes a u set to which an OFDM is assigned among u=0, 1, . . . , U−1.

$$I_{OFDM}(a, :) = \sigma_{OFDM,u}^2 = E_S^{(u)} \quad \text{Equation 24}$$

Here, a denotes a subcarrier index where an S-OTFS of an S-OTFS-based underlay method overlaps an OFDM and may be a=u$M_o$+{0, 1, 2, . . . , $M_o$−1}.

Figure 8:
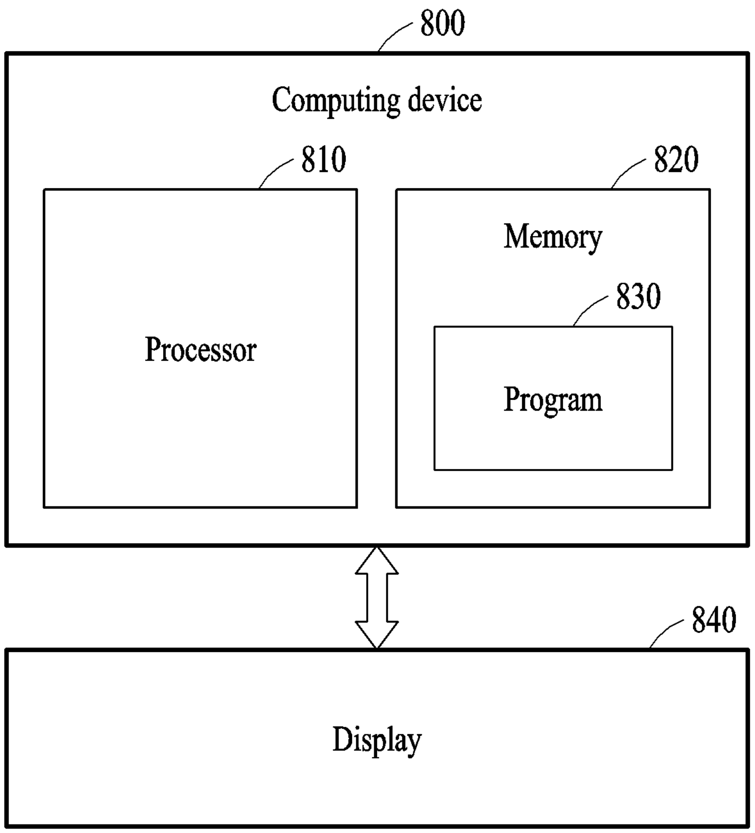
FIG. 8 is a diagram illustrating a configuration of a computing device transmitting and receiving a signal, which is included in a transmitter and a receiver of a target communication system (in an OTFS method) according to an embodiment.

FIG. 8 is a diagram illustrating a configuration of a computing device transmitting and receiving a signal, which is included in a transmitter and a receiver of a target communication system (in an OTFS method) according to an embodiment.

Referring to FIG. 8, a computing device 800 may include one or more processors 810 and a memory 820 for loading or storing a program 830 performed by the one or more processors 810. The components included in the computing device 800 are just an example, and one of ordinary skill in the art may understand that other generally used components may be further included, besides the components illustrated in FIG. 8.

The one or more processors 810 may control an overall operation of each component of the computing device 800. The one or more processors 810 may include at least one of a central processing unit (CPU), a microprocessor unit (MPU), a microcontroller unit (MCU), a graphics processing unit (GPU), a neural processing unit (NPU), a digital signal processor (DSP), and other well-known types of processors in a relevant field of technology. In addition, the one or more processors 810 may perform an operation of at least one application or program to perform the methods/operations described herein according to embodiments. The computing device 800 may include one or more processors.

The memory 820 may store one of or two or more combinations of various pieces of data, commands, and pieces of information that are used by the components (e.g., the one or more processors 810) included in the computing device 800. The memory 820 may include a volatile memory or a non-volatile memory.

The program 830 may include one or more actions through which the methods/operations described herein according to embodiments are implemented and may be stored in the memory 820 as software. In this case, an operation may correspond to a command that is implemented in the program 830. For example, the program 830 may include instructions causing the one or more processors 810 to perform an operation of mapping information symbols to be transmitted in a DD domain and determining an information symbol mapping matrix, an operation of applying an ISFFT to the information symbol mapping matrix and transmitting the information symbol mapping matrix into an FT matrix, and an operation of applying a Heisenberg transform to the FT matrix and generating a transmission signal of a time domain.

When the program 830 is loaded in the memory 820, the one or more processors 810 may execute a plurality of operations to implement the program 830 and perform the methods/operations described herein according to embodiments.

An execution screen of the program 830 may be displayed through a display 840. Although the display 840 is illustrated as being a separate device connected to the computing device 800 in FIG. 8, the display 840 may be included in the components of the computing device 800 when the computing device 800 is a smartphone, a tablet, or other terminals that are portable by a user. The screen displayed on the display 840 may be a state before the information is input to the program 830 or may be an execution result of the program 830.

The examples described herein may be implemented by using a hardware component, a software component, and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor, or any other device capable of responding to and executing instructions in a defined manner. The processing device may run an operating system (OS) and one or more software applications that run on the OS. The processing unit also may access, store, manipulate, process, and generate data in response to execution of the software. For the purpose of simplicity, the description of a processing unit is used as singular; however, one skilled in the art will appreciate that a processing unit may include multiple processing elements and multiple types of processing elements. For example, the processing unit may include a plurality of processors, or a single processor and a single controller. In addition, different processing configurations are possible, such as parallel processors.

The software may include a computer program, a piece of code, an instruction, or some combination thereof, to independently or collectively instruct or configure the processing device to operate as desired. Software and data may be stored in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs and/or DVDs; magneto-optical media such as optical discs; and hardware devices that are specially configured to store and perform program instructions, such as read-only memory (ROM), random-access memory (RAM), flash memory, and the like. Examples of program instructions include both machine code, such as produced by a compiler, and files containing higher-level code that may be executed by the computer using an interpreter.

The above-described devices may act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, other implementations, other examples, and equivalents to the claims are also within the scope of the following claims.

What is claimed is:

1. A signal transmission method performed by a transmitter of a target communication system sharing a frequency band of a general communication system in an underlay form, the signal transmission method comprising:

mapping information symbols to be transmitted to a delay-Doppler (DD) domain and determining an information symbol mapping matrix;

applying an inverse symplectic finite Fourier transform (ISFFT) to the information symbol mapping matrix and transforming the information symbol mapping matrix into a frequency-time (FT) matrix; and applying a Heisenberg transform to the FT matrix and generating a transmission signal of a time domain, wherein the transforming comprises:

applying a column-direction inverse fast Fourier transform (IFFT) and a row-direction IFFT to the information symbol mapping matrix and transforming the information symbol mapping matrix into the FT matrix.

2. The signal transmission method of claim 1, wherein the determining comprises:

mapping the information symbols to the DD domain such that a distance between the information symbols is maximized and determining the information symbol mapping matrix.

3. The signal transmission method of claim 1, wherein the determining comprises:

mapping the information symbols to a position determined by applying a random number and determining the information symbol mapping matrix.

4. The signal transmission method of claim 1, wherein the determining comprises:

arranging the information symbols consecutively in a region of the DD domain and determining the information symbol mapping matrix.

5. The signal transmission method of claim 1, wherein the generating comprises:

applying M-point IFFT to the FT matrix and deriving a delay-time (DT) matrix comprising samples of a DT domain; and performing signal processing on the DT matrix and generating a transmission signal of a time domain.

6. The signal transmission method of claim 5, wherein the generating further comprises:

adding a cyclic prefix (CP) signal by vectorizing the DT matrix in a row direction and generating the transmission signal of the time domain by performing parallel to serial (P/S) conversion.

7. A signal reception method performed by a receiver of a target communication system sharing a frequency band of a general communication system in an underlay form, the signal reception method comprising:

determining an estimate for a transmission signal of a time domain from a reception signal;

deriving a delay-time (DT) matrix comprising samples of a DT domain from the estimate for the transmission signal of the time domain;

applying a Wigner transform to the DT matrix and deriving a frequency-time (FT) matrix comprising samples of an FT domain from the DT matrix;

compensating a channel of the FT matrix by using a variance matrix of primary user signals transmitted and received through the general communication system; and applying a symplectic finite Fourier transform (SFFT) to the FT matrix of which the channel is compensated and extracting information symbols of a delay-Doppler (DD) domain, wherein the determining comprises using a covariance matrix of primary user signals transmitted and received through the general communication system and determining the estimate for the transmission signal of the time domain.

8. The signal reception method of claim 7, wherein the covariance matrix of the primary user signals is determined by using a cross-correlation function for a primary user signal of a uth subband.

9. The signal reception method of claim 7, further comprising removing a cyclic prefix (CP) signal from the reception signal, and the determining further comprises using the reception signal from which the CP signal is removed and determining the estimate for the transmission signal of the time domain.

10. The signal reception method of claim 7, wherein the transmission signal of the time domain is generated by mapping the information symbols to the DD domain such that a distance between the information symbols is maximized.

11. The signal reception method of claim 7, wherein the transmission signal of the time domain is generated by mapping the information symbols to the DD domain at a position determined by applying a random number.

12. The signal reception method of claim 7, wherein the transmission signal of the time domain is generated by arranging the information symbols consecutively in a region of the DD domain.

13. A signal reception method performed by a receiver of a target communication system sharing a frequency band of a general communication system in an underlay form, the signal reception method comprising:

determining an estimate for a transmission signal of a time domain from a reception signal;

applying a Wigner transform to the estimate for the transmission signal of the time domain and deriving a frequency-time (FT) matrix comprising samples of an FT domain from the transmission signal of the time domain;

compensating a channel of the FT matrix by using a variance matrix of primary user signals transmitted and received through the general communication system; and applying a symplectic finite Fourier transform (SFFT) to the FT matrix of which the channel is compensated and extracting information symbols of a delay-Doppler (DD) domain.

14. The signal reception method of claim 13, wherein the variance matrix of the primary user signals is determined by mapping a variance value to a subband assigned to a user in the FT domain and mapping a zero value to a subband not assigned to the user in the FT domain.

15. The signal reception method of claim 13, further comprising removing a cyclic prefix (CP) signal from the reception signal, and the determining further comprises using the reception signal from which the CP signal is removed and determining the estimate for the transmission signal of the time domain.

* * * * *